Figure 1:
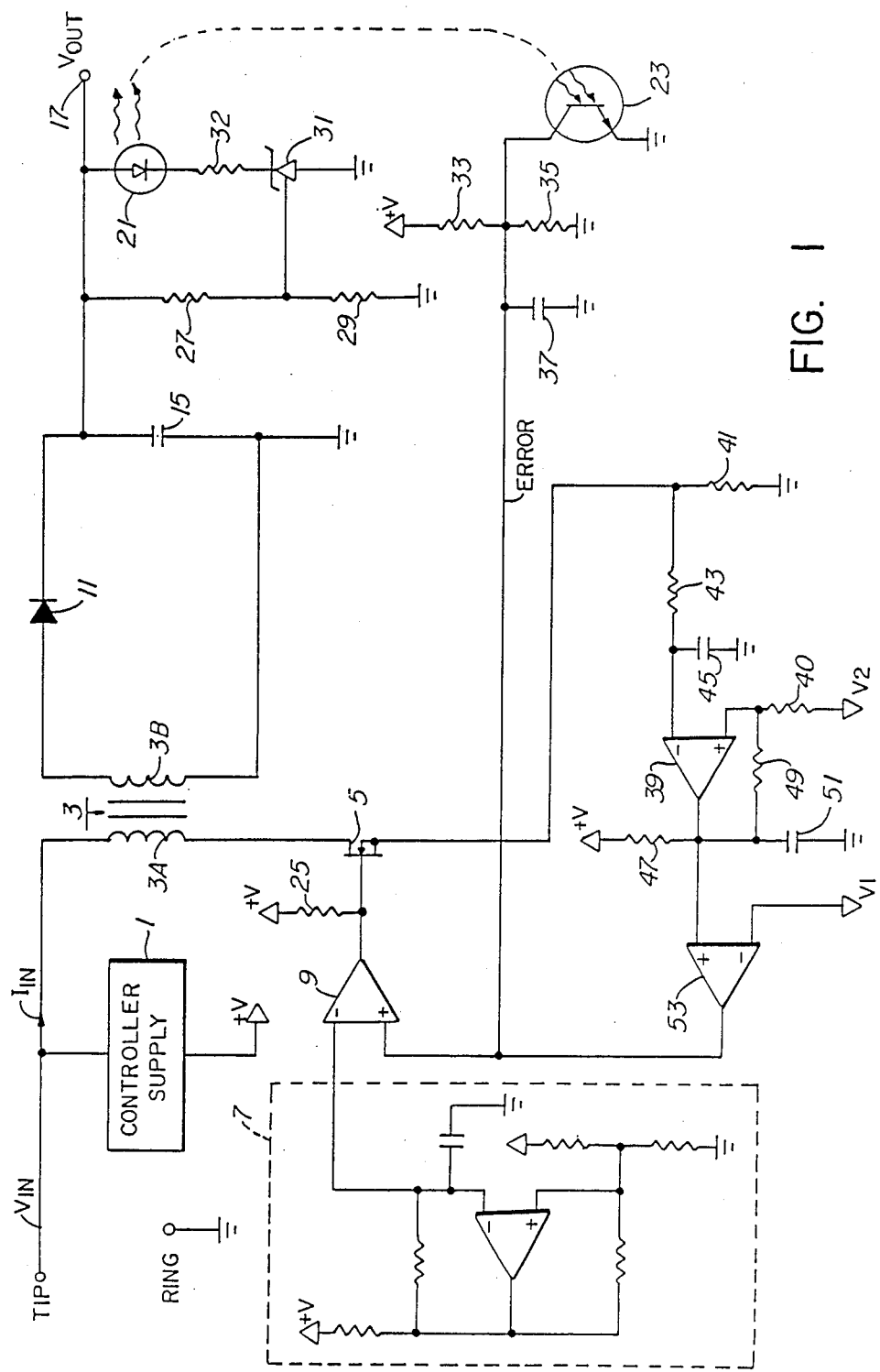

United States Patent [19]

Pinard

[11] Patent Number: 4,761,702

[45] Date of Patent: Aug. 2, 1988

[54] CMOS LATCH-UP RECOVERY CIRCUIT

[75] Inventor: Jim Pinard, Stittsville, Canada

[73] Assignee: Mitel Corporation, Kanata, Canada

[21] Appl. No.: 932,405

[22] Filed: Nov. 20, 1986

[30] Foreign Application Priority Data

Apr. 22, 1986 [CA] Canada .................. 507268

[51] Int. Cl.⁴ .............................................. H02H 7/10
[52] U.S. Cl. ........................................ 361/18; 361/75;
361/86; 361/89; 363/21; 363/56
[58] Field of Search ....................... 361/18, 56, 74, 75,
361/86, 89, 91, 78; 363/21, 26, 56, 79, 80, 78

[56] References Cited

U.S. PATENT DOCUMENTS

| 4,210,947 | 7/1980 | Koizumi | 361/18 |
| 4,415,960 | 11/1983 | Clark, Jr. | 363/56 X |
| 4,646,219 | 2/1987 | Röhl | 361/18 X |

FOREIGN PATENT DOCUMENTS

| 0084245 | 7/1983 | European Pat. Off. |
| 2005496 | 4/1979 | United Kingdom. |
| 1566940 | 5/1980 | United Kingdom. |
| 2126027 | 3/1984 | United Kingdom. |

Primary Examiner—A. D. Pellinen
Assistant Examiner—Todd E. DeBoer
Attorney, Agent, or Firm—Antonelli, Terry & Wands

[57] ABSTRACT

An overcurrent shut down circuit for use in a switching regulator power supply comprised of circuitry for detecting the average current of a pulse width modulated input signal, comparing the average current with a predetermined threshold level and reducing the duty cycle of the pulse width modulated signal to zero thereby shutting off the power supply, in the event the detected current exceeds the threshold level, indicating excess current being drawn from an output circuit of the supply. Time delay circuitry is provided for resetting the shut down circuit and restoring the regulator to normal operation after a predetermined amount of time as elapsed subsequent to the power supply being shut down. The overcurrent shut down circuit provides for recovery from CMOS latch-up and other excess current drawing fault conditions without requiring that the power supply be manually turned off. The circuit is of straightforward and inexpensive design and occupies very little circuit board area.

5 Claims, 1 Drawing Sheet

CMOS LATCH-UP RECOVERY CIRCUIT

This invention relates in general to power supply circuits, and more particularly to an overcurrent shut down circuit for momentarily shutting off a switching regulator power supply in the event of CMOS latch-up or other high current drawing fault conditions in circuits connected to the supply.

In the event excessively large input signals are applied to an amplifier, active devices (eg. transistors) can be driven into saturation or cut-off conditions. Under saturation conditions, local feedback loops may be set up due to parasitic transistors that are inadvertently established between p and n-type regions of an active device and the substrate. This local positive feedback results in what is known as latch-up.

Thus, in the event a large input signal is applied to an active device (due to static shock, etc.,) simultaneously with a power supply delivering current to the device, latch-up may occur. In general, recovery from latch-up is only possible by manually turning off or unplugging the power supply for a short period of time.

Considerable research has been conducted in the field of latch-up prevention. U.S. Pat. No. 4,209,713 issued June 24, 1980, to Tokyo Shibaura Electric Company Limited describes a circuit for eliminating the effects of parasitic conduction. A noise absorption means, typically in the form of a resistor, is connected between a source electrode of a CMOS circuit and a positive terminal of an external power source.

However, in a CMOS integrated circuit, resistors of appropriate values are difficult to fabricate. In addition, resistors restrict the full power supply voltage from being applied to the CMOS devices in the circuit.

Many circuit have been developed for controlling the timing of application of high and low voltage sources to a CMOS circuit in an effort to prevent the establishment of parasitic transistors leading to latch-up. For instance, U.S. Pat. No. 4,441,035, dated Apr. 3, 1984 and issued to Mitel Corporation discloses circuitry for controlling the timing of the application of high and low, similar polarity DC power supplies to a single CMOS circuit. According to the Mitel circuit, the application of the lower voltage supply is prevented until the higher voltage supply has been applied in order to substantially eliminate the formation of parasitic transistors.

U.S. Pat. No. 4,353,105 dated Oct. 5, 1982 and issued to National Semiconductor Corporation describes a protection circuit for bulk silicon CMOS circuits which detects latch-up, and in response starves the CMOS circuit of power for a predetermined length of time and re-enables normal circuit operation once the latch-up condition has been eliminated.

The devices described in the Mitel and National Semiconductor Corporation patents are typically disposed within the CMOS circuitry itself, requiring complex and expensive structure and fabrication techniques. In addition, the National Semiconductor protection circuit provides a control signal to the CMOS circuit which places the CMOS circuit in a low current standby mode. Accordingly, the CMOS circuit includes additional circuitry for interpreting the control signal, typically contributing to circuit complexity and expensive fabrication.

Numerous power supply circuits have been designed for providing correct application sequencing of high and low voltage sources to an active device. Such circuits are described for example in U.K. Pat. Nos. 1,331,962 published Sept. 26, 1973 of Matsushita Electric Industrial Co., Ltd., and U.K. Pat. No. 1,423,149 published Jan. 28, 1976 of Philips Electronic and Associated Industries Limited. These prior art power supply circuits utilize complex timing and sequencing circuitry in an effort to prevent CMOS latch-up and other high current drawing fault conditions yet provide no means for recovering from such conditions in the event that they occur.

In particular, according to the Philips patent, a power supply is provided with circuit means which in the event of operation in a fault condition, reduces the output voltage by approximately half its nominal value, but not to zero volts. Thus, in the event of latch-up, the CMOS circuits would remain latched-up in spite of the reduced voltage. Similarly, according to Matsushita patent, a power supply system is described wherein circuitry is provided for interrupting the supply of power in the event of an excessively large input signal or in the event of a short circuited load. This well known over voltage protection technique suffers from the disadvantage of requiring a switch for restoring thyristor circuitry to its original state to reactivate the power supply, since the thyristor circuitry is incapable of self-restoration even when the overcurrent disappears. Thus, the Matsushita patent suffers from the disadvantage of requiring manual resetting of the power supply.

According to the present invention, an overcurrent shut down circuit is included in a power supply, which monitors input current, and in the event the current exceeds a predetermined threshold level, shuts off the power supply for a predetermined length of time after which the supply is automatically reset. The shut down circuit is disposed within the power supply, thereby overcoming the disadvantages associated with prior art complex expensive CMOS protection circuits wherein the CMOS circuits themselves were required to include complex on board circuitry.

The circuit according to the present invention actually provides for recovery of the power supply in the event of a fault condition, and does not merely attempt to prevent such a condition by means of complex timing and delay circuitry as used in prior art sequencing power supply circuits.

A better understanding of the invention will be obtained with reference to the detailed description below in conjunction with the following drawing, in which:

FIG. 1 is a schematic diagram of an overcurrent shut down circuit for use in a switching power supply regulator according to the present invention.

With reference to FIG. 1, an unregulated input voltage $V_{IN}$ is applied to one lead (TIP) of a balanced lead pair TIP and RING, commonly found in telephone systems such as PABXs, the RING lead being connected to ground.

A controller supply 1 receives the unregulated input voltage (typically in the vicinity of 25–60 volts) and generates an output voltage +V, in the range of from 4 to 6 volts. Control supply 1 is in the form of a series-pass regulator for providing the reference voltage +V in a well known manner.

An input current $I_{IN}$ carried by the TIP lead passes through a primary winding 3A of a transformer 3 and is pulse width modulated via FET power transistor 5, under control of pulse width modulating circuitry including a triangle wave oscillator 7 and comparator 9, as described in greater detail below.

During each cycle that transistor 5 is conducting, input current transformer 3 stores energy received directly from the balanced TIP and RING leads. During each cycle that transistor 5 is not conducting, the primary coil 3A releases the stored energy to a secondary coil 3B according to well known principles of electromagnetic coupling. In response, a voltage develops across coil 3B which is rectified via a diode 11.

The rectified voltage output from diode 11 is filtered via a capacitor 15 (which in the successful prototype was 100 μFarad), connected between the output of diode 11 and isolated ground. The resulting filtered output voltage signal $V_{OUT}$ is applied to an output terminal 17 for application to external circuitry, such as CMOS circuits, etc.

Voltage-series negative feedback of the output voltage signal $V_{OUT}$ is provided for regulating the power supply in a well known manner. In particular, a triangle wave oscillator 7 generates a triangle wave signal (which in a successful prototype was at 28 kHz frequency) for application to an inverting input of comparator amplifier 9. A representation of the output voltage signal $V_{OUT}$, denoted as ERROR, is transmitted via optical isolation circuitry including photodiode 21 and photo-transistor 23, for application to a non-inverting input of comparator 9. The D.C. level of the ERROR signal is compared in comparator 9 to the generated triangle wave signal such that comparator 9 generates a pulse control signal for application to transistor 5, having a duty cycle which varies linearly with the D.C. level of the ERROR signal.

The open collector output of comparator 9 is connected via pull-up resistor 25 to the reference voltage +V, and also directly to a gate terminal of FET transistor 5 for causing pulse width modulation of the input current $I_{IN}$ through the source-drain circuit transistor 5, as described above.

In operation, once the D.C. level of the output voltage signal $V_{OUT}$ reaches a desired output level (for example +5 volts) precision comparator 31 is activated via detection of a predetermined voltage (eg. 2.5 volts) appearing at the node connecting voltage divider resistors 27 and 29, which results in current flowing to isolated ground through photodiode 21, resistor 32, and comparator 31. Photodiode 21 and photo-transistor 23 are preferably configured as an opto-isolator circuit according to well known techniques. Photo-transistor 23 operates as a common-emitter circuit for generating the aforementioned ERROR signal representing the output voltage signal $V_{OUT}$. Thus, as the current drawn through photodiode 21 decreases, the D.C. level of the ERROR signal carried by the collector terminal of photo-transistor 23 increases. This, in turn causes the duty cycle of the pulse width modulated control signal from amplifier 9 to increase, resulting in more input current flowing through primary coil 3A via transistor 5, thereby delivering greater power to the secondary coil 3B and consequently to the output terminal 17.

The ERROR signal from transistor 23 is voltage limited via resistors 33 and resistor 35, and filtered via capacitor 37 connected to ground. This provides for duty cycle limiting of comparator 9 in the event of power up/down and low line voltage conditions.

The supply is protected from excessive load currents, typically accidental CMOS latch-up, by an overcurrent shut down circuit for monitoring the average D.C. input current $I_{IN}$ flowing through primary coil 3A and power transistor 5, and interrupting the power supply output in the event of excess current drawn for a predetermined length of time after which the supply is reactivated.

The input current $I_{IN}$ is translated to a voltage across a sensing resistor 41 (which in a successful prototype was approximately 10 ohms), and subsequently filtered to an average D.C. level via resistor 43 connected to capacitor 45, and the average D.C. signal is applied to an inverting input of comparator 39. A non-inverting input of comparator 39 is connected via a resistor 40 to a predetermined threshold voltage V2 for establishing a threshold level for the input current $I_{IN}$ above which the power supply is interrupted.

The output of comparator 39 is connected via a pull up resistor 47 to the reference voltage +V and to ground via a timing circuit comprised of resistor 49 and capacitor 51. The node connecting the output of comparator 39, resistors 47 and 49, and capacitor 51 is also connected to an non-inverting input of a further comparator 53, having an inverting input thereof connected to a threshold voltage source V1, (eg. 1.5 volts).

In the event the average D.C. input current $I_{IN}$ exceeds the predetermined threshold voltage, the output of comparator 39 goes to a low voltage level causing the output voltage on comparator 53 to go to ground level, thereby grounding the D.C. ERROR signal applied to the non-inverting input of comparator 9. The D.C. ERROR signal is grounded for a predetermined length of time governed by the time constant of resistor 49 and capacitor 51, which in a successful prototype was approximately 50 milliseconds, allowing sufficient time for the CMOS circuitry to recover from latch-up.

In response to grounding of the D.C. ERROR signal, the output of comparator 9 goes to a logic low level, thereby shutting off transistor 5 and interrupting the power supply.

Once the current in the primary coil 3A stops flowing, capacitor 51 begins recharging and the power supply circuit is restored to normal operation within the predetermined time limit (50 milliseconds).

The output of comparator 53 is an open collector such that during normal operation, the overcurrent shut down circuitry appears as a high impedance or open circuit to the non-inverting input of comparator 9.

In summary, a switch mode fly back regulator power supply is disclosed incorporating an overcurrent shut down or latch-up recovery circuit for providing supply cycling in the event of CMOS latch-up or accidental power supply fault conditions, such as short circuits. By incorporating the recovery circuitry within the power supply itself, expensive and complicated prior art CMOS protection circuits are avoided.

A person understanding the present invention may conceive of other embodiments thereof. All such modifications are believed to be within the sphere and scope of the present invention as defined by the claims appended hereto.

I claim:

1. In a switching regulator including an input circuit for receiving an input signal, means for pulse width modulating said input signal thereby generating a modulated input signal, means for coupling said modulated input signal to an output circuit, thereby forming an output signal having a D.C. voltage level proportional to the duty cycle of said modulated input signal, means for monitoring said output signal and generating an error signal for application to a D.C. feedback circuit in response thereto, and means for receiving said error signal from said feedback circuit and varying the duty cycle of said modulated input signal in proportion to variations in the D.C. level of said error signal; an overcurrent shut down and recovery circuit, comprised of:

(a) means for detecting the average D.C. level of said modulated input signal and generating an average D.C. input signal in response thereto, (b) means for comparing said average D.C. input signal with a predetermined threshold signal and connecting said feedback circuit to ground potential in the event said average D.C. input signal is greater than said threshold signal, whereby the duty cycle of said modulated input signal is reduced to zero thereby reducing the D.C. voltage level of said output signal to zero volts, and (c) time delay means for removing said feedback circuit from ground potential after a predetermined delay time, thereby reapplying said error signal to said means for varying the duty cycle of said modulated input signal, and restoring the D.C. voltage level of said output signal to a normal level.

2. An overcurrent shut down circuit as defined in claim 1, wherein said means for comparing is comprised of a first comparator having a first input connected via low pass filter circuitry to said means for pulse width modulating the input signal, a second input cnnected to a source of said predetermined threshold signal, and an output connected to said time delay circuitry; and a second comparator having a first input thereof connected to said output of the first comparator and said time delay circuitry, a second input thereof connected to a source of reference voltage, and an open collector output thereof connected to said feedback circuit.

3. An overcurrent shut down circuit as defined in claim 1, wherein said time delay means is comprised of a resistor capacitor circuit for generating said predetermined delay time sufficient for said output circuit to restoring from a CMOS latch-up condition prior to restoring the D.C. voltage level of said output signal to the normal level.

4. An overcurrent shut down circuit as defined in claim 1, further including open collector output means for applying a high impedance to said feedback circuit during normal operation of the regulator.

5. An overcurrent shut down ciruit as defined in claim 4, wherein said means for comparing is comprised of a first comparator having a first input connected via low pass filter circuitry to said means for pulse width modulating the input signal, a second input connected to a source of said predetermined threshold signal, and an output connected to said time delay circuitry; and a second comparator having a first input thereof connected to said output of the first comparator and said time delay circuitry, a second input thereof connected to source of reference voltage, and an open collector output thereof connected to said feedback circuit.

* * * * *